United States Patent Office 3,496,066
Patented Feb. 17, 1970

3,496,066
DIAGNOSTIC AIDS FOR USE IN THE DETECTION OF BACTERIA IN BIOLOGICAL AND OTHER FLUIDS
Herbert Berger, Sulzberg-Ried Allgau, Otto Dold, Ilvesheim, Dietrich Kruger, Plankstadt Brea Schwetzingen, Kurt Stach, Mannheim, Felix Helmut Schmidt, Mannheim-Neuosthiem, and Harald Stork, Lampertheim-Hessen, Germany, assignors to C. F. Boehringer & Soehne GmbH., a corporation of Germany
No Drawing. Filed Feb. 15, 1967, Ser. No. 616,201
Claims priority, application Germany, Mar. 29, 1966, B 86,402
Int. Cl. C12k 1/04, 1/10
U.S. Cl. 195—103.5                                17 Claims

ABSTRACT OF THE DISCLOSURE

The invention is directed to novel compounds of the formula

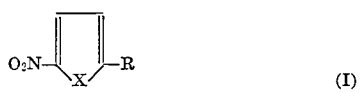

(I)

wherein X is oxygen, sulfur or an alkylated nitrogen atom and R is

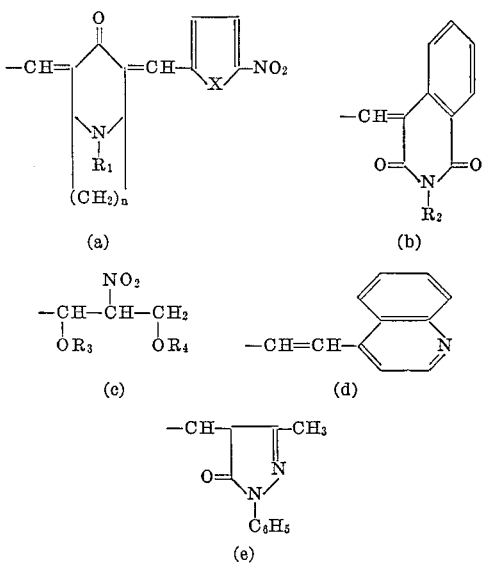

wherein $R_1$ is an aliphatic, aromatic, araliphatic, acyl, hydroxy, or acyloxy aliphatic radical. $R_2$ is hydrogen or lower alkyl, $R_3$ and $R_4$ are both hydrogen, or, together, an isopropylidene radical and $n$ is 2 or 3; diagnostic agents containing said compounds for use in the detection of bacteria in biological and other fluids, and the process for detecting bacteria in such fluids using said agents which comprises incubating the fluid to be investigated in the presence of a nutrient medium and a compound as above set out, the number of bacteria being directly related to the color change thereafter observed.

---

The present invention relates to diagnostic agents for use in the detection of bacteria, and to the methods for manufacturing and using the same. Still further, this invention relates to a class of novel compounds which are metabolized by bacteria whereby metabolic products constituting dyestuffs are produced. The presence or absence of color formation, as well as degree thereof, being directly related to the amount, if any, of bacteria present.

For the rapid and effective diagnosis and combating of infectious diseases, it is desirable to be able to detect as quickly as possible both qualitative and quantitatively the microorganisms causing the disease and further to be able to differentiate them with certainty. In addition to the classical serological methods, a number of investigational processes are known in which the enzymes formed by the microorganisms are detected by means of a color indicator or in which the metabolic products of specific bacteriophages are utilized for the detection of the bacteria.

Thus, for example, the detection of certain kinds of bacteria is possible by means of the Griess nitrite test in which nitrate is reduced to nitrite by the nitrite reductase formed by the bacteria, the presence of nitrite being detected with sulphanilic acid and α-naphthylamine (H. J. Walther, Ärztl. Lab., 6, 287/1960). Since this test constitutes only a non-specific and not very reliable means for the detection of nitrite and does not constitute a specific or direct detection of the bacteria, it has only a limited and conditional importance (Linzenmeier et al., Klin. Wschr., 41, 919/1963).

Another method which has been proposed for the detection of bacteria depends upon the reduction of the colorless 2,3,5-triphenyl-tetrazolium chloride to the red-brown colored triphenyl-formazane by reductases peculiar to bacteria. This reaction is entirely non-specific and, therefore, does not permit a differentiation of the bacteria present (Simmons, et al., Lancet, 1, 1377/1962).

In U.S. Patent No. 3,122,480, there is disclosed a method for the detection of strains of Pseudomonas which depends upon the reaction of enzymes peculiar to bacteria with p-phenylene-diamine and substituted naphthol derivatives whereby colored compounds (indophenol blue) are produced. In carrying out this detection method, the microorganisms to be identified must first be caused to grow by the use of selective nutrient media, which requires incubation periods of about 18 hours at 37° C. For the isolation of an important causative organism of infections of the urinary tract, namely, Pseudomonas aeruginosa, very special nutrient media are required, thereby rendering the use of this known process even more difficult. However, the really important disadvantage of this process is the fact that Escherichia coli and the enterococci, such as Streptococcus faecalis, are not detected, although these two latter organisms are found to be the causative organisms in more than two-thirds of all non-specific infections of the urinary tract.

In U.S. Patent No. 2,970,945 there has been described for use in the detection of a special strain of bacteria, namely, the gonococci, tetramethyl-p-phenylene-diamine, the indicator substance thereby being oxidized to a dyestuff by oxidases peculiar to the bacteria. Because of the atmospheric sensitivity of the indicator substance and of the limitation to one strain of bacteria, a general importance cannot be attributed to this reaction.

Finally, a number of publications have appeared which describe processes for the detection of bacteria wherein bacteriophages are utilized (H. J. Raettig, "Bakteriophagie," pub. Gustav Fischer-Verlag, Stuttgart, 1958, p. 53). However, for several reasons, it has not been possible to develop this method into one for routine use because "there are hardly any monovalent bacteriophages for one strain of bacteria and . . . these few monovalent phages easily become polyvalent and thus extend to other bacterial strains." Furthermore, since bacteria are very frequently phage-resistant, the already very laborious and time-consuming detection is, in addition, not dependable and is unsuitable in practice.

This invention has as an object a simple and practical diagnostic aid for use in the detection of bacteria in biological and other fluids.

Another object of this invention is a simple, practical and reliable method for the detection of bacteria in biological and other fluids.

A further object of the invention is a simple and practical method for producing a diagnostic aid for use in the detection of bacteria in biological and other fluids.

A still further object of the invention is a class of chemical compounds which are metabolized by bacteria to produce colored dyestuffs, the intensity and nature of which can be used for quantitative and sometimes qualitative detection of bacteria.

These and other objects will be apparent from a consideration of the following disclosure:

In accordance with the invention, it has now been found that compounds of the formula:

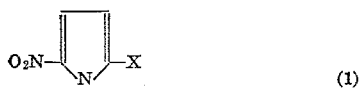

wherein X is oxygen, or an alkylated nitrogen atom and R is one of the following radicals:

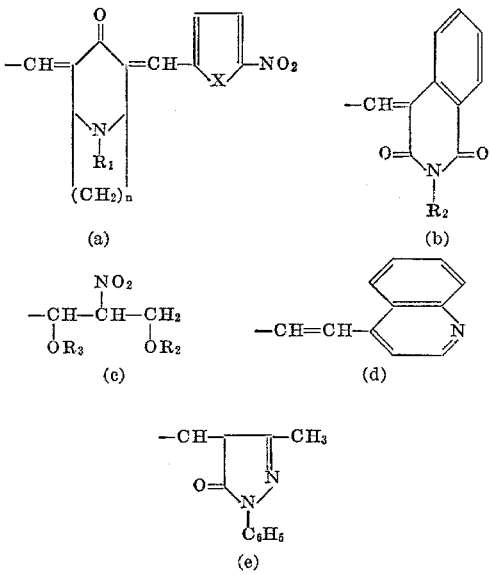

wherein $R_1$ is a saturated or unsaturated aliphatic, aromatic, araliphatic, acyl, hydroxy or acyloxy-aliphatic radical, $R_2$ is a hydrogen atom or a lower alkyl radical, $R_3$ and $R_4$ are both hydrogen atoms or together form an isopropylidene radical and $n$ is 2 or 3, are suitable for use in the detection of bacteria in biological fluids such as spinal fluid, peritoneal fluid, serum, and urine, and other fluids such as milk, water, infusion liquids and the like, in that they gave rise to a color reaction in the presence of bacterial microorganisms.

This new means for the detection of bacteria depends upon the fact that the compounds of Formula 1 are metabolized by bacteria to produce dyestuffs, the reaction being, in some cases, even specific for strains of bacteria.

The process according to the present invention for detecting bacteria is carried out by bringing together the biological fluid to be investigated with a liquid or solid nutrient medium and a non-growth-inhibiting amount of a compound of Formula 1. Following an incubation time of 1–18 hours at 20–37° C., the color change is evaluated.

The diagnostic agents according to the present invention comprise a liquid or solid nutrient medium and a non-growth-inhibiting amount of a compound of Formula 1.

Using the new test procedure according to the present invention, there can be carried out a process for generally detecting bacteria, i.e., a qualitative total determination of microorganisms. In other words, it is possible to detect a plurality of microorganisms which can, for example, be present at the same time in the biological fluid as a result of an infection of the urinary tract, by means of a common color reaction. However, there can also be achieved a differentiation of the microorganisms, i.e., a qualitative detection of individual types of microorganisms. In other words, individual types of microorganisms, for example, only *Escherichia coli*, can, on the basis of a color reaction specific for the microorganisms in question, be detected and exactly determined. The sample of biological fluid to be tested can, in this connection, also be tested successively with several different diagnostic agents according to the present invention, those compounds of structural Formula 1 being advantageously chosen which give easily differentiable, specific color reactions. In addition, preferred forms of these combinations also contain selectively effective bactericidal or bacteriostatically-effective substances and/or differentiating nutrient media which provide especially favorable growth conditions for the type of microorganism to be detected but which inhibit undesired accompanying microorganisms.

Since, in the case of certain of the compounds having structural Formula 1, the time for the coloration to appear depends upon the number of microorganisms originally present, the process according to the present invention carried out with the diagnostic agents herein disclosed, provides a means whereby semi-quantitative determinations of the number of microorganisms is also possible.

In carrying out the process according to the present invention, the solution to be analyzed, such as, for example, urine, milk, water or the like, is added to a nutrient broth which is contained, for example, in a test tube, the broth having present therein a sufficient but non-growth-inhibiting amount of one of the compounds of structural Formula 1. An upper limitation of the amount of compounds of Formula 1 to be added is necessary because the compounds (1) possess certain bactericidal or bacteriostatic properties. Because of this fact, it was, indeed, to have been expected that, in the presence of these compounds, bacterial growth would no longer have been possible so that the compounds also could not be metabolized by bacteria thereby giving rise to the colored dyestuffs. Surprisingly, however, for the detection reaction according to the present invention, there are necessary amounts which are substantially smaller than the minimum inhibiting concentrations and no disturbances or blocks occur in carrying out the test procedure.

Certain of the compounds of structural Formula 1 are only sparingly soluble. In such instances, it is advantageous to add a solubilizer in order to provide sufficient concentrations of the compounds for the color reaction. The test mixture is left for a few hours at room temperature or in an incubation oven, or bath at a temperature of 37° C. and the color changes evaluated from time to time. Instead of a liquid nutrient broth, the compounds of structural Formula 1 can also be mixed with a warmed, liquid nutrient agar and, after cooling, the liquid to be tested applied onto the solidified nutrient medium.

Instances of preferred forms of the diagnostic agents according to the present invention include nutrient-containing tablets of nutrient-containing filter paper strips which already contain a compound having the structural Formula 1. If a tablet is used for carrying out the detection reaction in accordance with the invention, the same need only be dissolved in a sample of the liquid to be tested. After an incubation time of from 1–18 hours, the color change can be evaluated directly. In the case of the use of filter paper test strips, the strips are dipped for a short time in the solution to be tested, then placed in a small, sterilized test tube and kept for some time at room temperature or at 37° C. The result can then be read off directly. In order to maintain the tablets or filter paper strips storable, they are advantageously sterilized with ethylene oxide and sealed between sterilized foils which can easily be removed prior to use.

The advantages of the process according to the present invention and of the diagnostic agents of the present invention are, in the first place, the simple and practical manner in which they can be handled, as well as their reliability in indicating that microorganisms are present, the amount and nature thereof. In particular, the casual microorganisms which occur in the case of non-specific infections of the urinary tract, such as *Escherichia coli, Streptococcus faecalis, Proteus mirabilis, Staphylococcus aureus, Klebsiella pneumonia* and *Pseudomonas aeruginosa*, can be dependably detected. Furthermore, according to the present invention it is also possible not only to detect the general presence of bacteria but also to carry out quantitative and semi-quantitative individual determinations of special types of microorganisms, without first having to carry out laborious, expensive and time-consuming isolations of the causal microorganisms in pure cultures.

It is also possible to carry out the detection reactions, without the use of an incubation oven or bath, at room temperature but in such cases somewhat longer incubation periods must be used. Whereas with the use of an incubation oven, times of only 1–12 hours are necessary, at room temperature it is usually necessary to permit from 4–18 hours to elapse in order that a clear coloration be obtained. In the case of the use of prepared nutrient media, test papers and tablets, the usual preparation times are rendered unnecessary and it is necessary only to use test tubes and/or pipettes in carrying out the determinations.

It has also been found that the incubation times required in actual practice can be considerably shortened and a clearer distinction between "normal" and "asymptomatic/significant" ranges of the number of microorganisms can be achieved when the material to be investigated, such as a nutrient broth containing microorganisms or urine containing microorganisms which has been mixed with a nutrient medium, is incubated without the addition of one of the compounds having structural Formula 1, after which a compound of Formula 1 is added, incubation continued for a short period of time and the color change then evaluated.

In the case where a urine sample is being analyzed, a period of about nine-ten hours is necessary when a compound of structural Formula 1 is added immediately, whereas with the use of this modified procedure, the end result can be obtained after only about five-six hours.

Finally, it has also been found that the incubation time required in actual practice can also be significantly reduced and a clearer distinction between "normal" and "asymptomatic/significant" ranges of the number of microorganisms can be achieved when the material to be investigated, such as a nutrient broth containing microorganisms or urine containing microorganisms, which has been mixed with a nutrient medium, is additionally mixed with coenzymes, as well as, if desired, a sulphydroyl group-containing compound and/or enzyme-activating heavy metal ions.

Coenzymes, which can be used in the foregoing procedure, include, for example, nicotine-adenine-nucleotide (NAD) or nicotine-adenine-nucleotide phosphate (NADP) or the reduction products thereof.

As sulphhydryl group-containing compounds, there are preferably used cysteine, reduced glutathione, cysteamine or β-mercapto-ethanol. In place of the compounds having free sulphhydryl groups, there can also be used the corresponding dehydrogenated disulphide compounds.

Enzyme-activating heavy metal ions, which are suitable for use in accordance with the invention, are preferably provided by the salts of manganese and copper.

These additives accelerate with coloration, not only in the case in which a compound having the Formula 1 is present initially, but also in the case in which a compound of Formula 1 is added after a preliminary period of incubation. Since the time factor plays a decisive part for the practical application of the process according to the present invention, the working method using a preliminary incubation and subsequent addition of a compound of structural Formula 1 is preferably further accelerated and improved by the addition to the nutrient medium of the above-mentioned further additives.

Excellent results are even obtained by the addition of the coenzymes alone. However, optimum results are obtained when, in addition, a sulphhydryl group-containing compound and heavy metal ion, preferably in the form of a manganous salt, are also present.

Thus, for example, after a preliminary incubation of only one-two hours at 37° C., the addition of a non-growth-inhibiting amount of a compound of structural Formula 1 and a subsequent incubation for 30 minutes at 37° C. permits the clear recognition of a large number of microorganisms. In the case of incubating for a further one-two hours, smaller numbers of microorganisms of up to 100,000 permilliliter, which are, however, also of interest in practice, can also be identified.

For this variant of the process according to the present invention, it has proved to be particularly useful to employ gelatine capsules which contain all the components of the nutrient broth and the above-mentioned additives. The contents of a capsule, which are sufficient for use in one determination, are shaken out into the fluid specimen. After the preliminary incubation period, a compound of structural Formula 1, preferably in the form of a stable solution, is added thereto. After a relatively short further period of incubation, the coloration is evaluated.

The compounds of structural Formula 1 are new. They can be prepared using the known methods as, for example, described in the following:

I.—General procedure for the preparation of N-substituted 2,4-di-(5-nitro-2-furfurylidene)-granatan-3-one and 2,4-di-(5-nitro-2-furfurylidene)-tropinone derivatives of Formula 1a 0.1 mol of an N-substituted norgranatan-3-one or -tropinone (see infra) was heated under reflux and with stirring for three hours with 28.2 g. (0.2 mol) 5-nitro-furfural in 50 ml. acetic anhydride. The reaction mixture was thereupon stirred with ice water, the precipitated crystalline substance filtered off with suction and recrystallized. The compounds set out in the following table were prepared in this manner:

| | $R_1$ | X | n | Yield, percent | M.P., ° C. | Recrystallized from— |
|---|---|---|---|---|---|---|
| Compound No.: | | | | | | |
| I | $-CH_2CH_2OCOCH_3$ | O | 3 | 83 | 144–145 | Alcohol/glacial acetic acid. |
| II | $-CH_3$ | O | 3 | 63 | 226–228 | Isopropanol. |
| III | $-CH_3$ | O | 2 | 18 | 203–204 | Do. |
| IV | $-C_2H_5$ | O | 3 | 56 | 226–227 | Dimethyl formamide. |
| V | $-C_6H_5$ | O | 3 | 5 | 218–220 | Butanol. |
| VI | $-CH_2C_6H_5$ | O | 3 | 74 | 215–217 | Dioxan. |
| VII | $-CH_2CH=CH_2$ | O | 3 | 37 | 186–187 | Isopropanol. |
| VIII | $-OH$ | O | 3 | 9 | 254 (decomp.) | Toluene |
| IX | $-CH_2CH_2C_6H_5$ | O | 3 | 94 | 158–159 | Isopropanol. |
| X | $-COCH_3$ | O | 3 | 14 | 255 (decomp.) | Acetic acid. |
| XI | $-CH_3$ | S | 3 | 43.3 | 210–212 | Do. |

The N-hydroxy-norpseudopelletierine required as starting material for the preparation of Compound (VIII) is also new and can be prepared in the following manner:

146 g. (1 mol) acetone dicarboxylic acid, 56 g. sodium acetate trihydrate, 69.6 g. hydroxylamine hydrochloride and 400 ml. 25% glutaric dialdehyde solution were dissolved in 1,000 ml. water. The evolution of carbon dioxide set in immediately. The solution was allowed to stand for three days at room temperature. It was then rendered alkaline with a solution of sodium hydroxide and extracted with chloroform. The extract was dried and evaporated. As residue, there were obtained 108.6 g. N-hydroxy-norpseudopelletierine. The compound was recrystallized from ethyl acetate and had a melting point of 137–139° C. The yield of N-hydroxy-norpseudopelletierine amounted to 51% of theory.

II.—General procedure for the preparation of 5-nitrofurfurylidene derivatives of homophthalimide of Formula 1b 0.05 mol homophthalimide or N-methyl-homophthalimide was dissolved in 100 ml. acetic anhydride. 7 g. (0.05 mol) 5-nitrofurfural were added thereto and the reaction mixture heated to 70° C. After some time, the precipitated material was filtered off with suction, washed with ether and recrystallized. The compounds set out in the following table were prepared in this manner:

|  | $R_2$ | Period of reaction hours | Yield, percent | M.P., °C. | Recrystallized from— |
|---|---|---|---|---|---|
| Compound No.: | | | | | |
| XII | H | 5 | 80 | 278 | Acetic acid. |
| XIII | $CH_3$ | 1.5 | 41 | 226–227 | Dioxan. |

III.—1-phenyl-3-methyl-4-(5-nitro-2-furfurylidene)-pyrazol-5-one of Formula 1e (compound no. XIV)

17.4 g. (0.1 mol) 1-phenyl-3-methyl-pyrazol-5-one and 14.1 g. (0.1 mol) 5-nitrofurfural in 150 ml. acetic anhydride were stirred for three hours at 100° C. After cooling, the reaction mixture was filtered with suction and 28.7 g. of crude product were recovered. After recrystallization from dioxan, there was obtained 1-phenyl-3-methyl - 4 - (5-nitro-2-furfurylidene)-pyrazol-5-one in a yield of 55.1% of theory. This compound melted at 234° C., with decomposition.

IV.—3 - (5-nitro-2-thienyl)-2-nitro-propane-1,3-diol and 2,2-dimethyl-4-(5-nitro-2-thienyl)-5-nitro-1,3-dioxan of Formula 1c (compounds nos. XV and XVI)

6.28 g. 5-nitro-thiophene-2-aldehyde were dissolved in 40 ml. chloroform, 4.4 g. nitro-ethanol, dissolved in 20 ml. chloroform were added thereto, and the reaction mixture mixed with 0.4–0.6 ml. triethylamine and allowed to stand at room temperature. After only a short time, an oil precipitated out which, after cooling and triturating, crystallized. After standing for several hours in a refrigerator, the product was filtered off with suction, washed with chloroform. There were thusly obtained 9.1 g. (91.8% of theory) of a crude product having a melting point of 111–114° C. After recrystallization from isopropanol-water (1:1), with the addition of a trace of p-toluene-sulphonic acid, there was obtained analytically-pure 3-(5-nitro-2-thienyl)-2-nitro-propane-1,3-diol having a melting point of 136–140° C.

1.24 g. of the crude diol obtained as above (M.P. 111–114° C.) were dissolved in 6 ml. anhydrous acetone, 12 ml. anhydrous benzene, and an intimate mixture of 0.6 g. phosphoric pentoxide and 0.6 g. kieselguhr, were added thereto. The reaction mixture was heated to 40–45° C. After 15 minutes, a further 12 ml. benzene was added and the reaction mixture thereafter stirred for about six hours at 40–45° C. Any undissolved material was then filtered off with suction and washed with ethylene chloride into the filtrate. The filtrate was neutralized with an aqueous slurry of calcium carbonate and the undissolved material present filtered off with suction. The aqueous phase of the filtrate was extracted with ethylene chloride. The organic phases were combined, dried over anhydrous sodium sulphate and evaporated in a vacuum, 1.4 g. of an oil thereby remaining behind. This was first triturated with ligroin and then with isopropyl ether, the crystals thus obtained filtered off with suction and then washed with isopropyl ether. There were thus obtained 0.8 g. of crystals (55.5% of theory) having a melting point of 105–108° C. Following recrystallization from isopropanol, the melting point of the 2,2-dimethyl-4-(5-nitro-2-thienyl)-5-nitro-1,3-dioxan obtained increased to 107–109° C. (decomp.). The yield amounted to 0.55 g.

V.—1-(5-nitro-1-methyl-2-pyrryl)-2-(4-quinolyl)-ethylene of Formula 1d (compound no. XVII)

1.68 g. 4-methyl-quinoline were heated for four hours under reflux (160° C.; bath temperature) with 1.85 g. 5-nitro-1-methyl-pyrrole-2-aldehyde in 12 ml. acetic anhydride. After cooling the resulting reaction mixture, the precipitated yellow crystals were filtered off with suction, washed with a little acetic anhydride and then with isopropyl ether. There were thusly obtained 0.6 g. (18% of theory) of paper chromatographically pure material. Following recrystallization from 17 ml. dioxan, with the addition of activated charcoal, the compound melted at 240–242° C. (decomp.). The yield was 0.45 g.

The following examples are given for the purpose of illustrating the process according to the present invention and also the diagnostic agents according to the present invention. The examples are in nowise to be construed in limitation of the invention:

EXAMPLE 1

General procedure for carrying out the detection of bacteria 25.6 g. of a compound corresponding to structural Formula 1 were dissolved in 5 ml. dimethyl formamide and 5 ml. polyoxyethylene sorbitan laureate ("Tween 20") (a registered trademark of Atlas Powder Co.). Using sterilized distilled water there was prepared a geometric dilution series (factor 0.5) which was diluted with a conventional nutrient broth, such as that supplied by Difco, in a ratio of 1:10. Accordingly, the individual solutions contained 256, 128, 64, 32, 16, etc. µg./ml. of the compound of Formula 1. Sterilized test tubes were then each filled with 2 ml. of these solutions and mixed with the bacteria-containing sample to be tested. The test tubes were sealed with a sterilized cottonwool swab and incubated at 21–37° C. In place of an incubation cabinet, there could also have been used a thermostatically-controlled water bath. In dependence upon the type of microorganism, the period of incubation and the number of microorganisms initially introduced, the test sample began to become colored. The color and the time of coloration were compared with standard values and, in this manner, the nature and number of the bacteria were indicated. Because of the bacteriostatic action of some of the compounds of Formula 1 to certain strains of microorganisms, only rather weak colorations or no colorations at all were produced in the test samples with high concentrations of the compound of Formula 1 being evaluated. In general, therefore, only the test samples with the lower concentrations were evaluated.

In the following Tables I, II and III, there are summarized the typical colorations depending upon the compound of Formula 1 used, the nature of the microorganism, the temperature and the incubation period. In general, the number of microorganisms is above 100,000/ml., i.e., the microorganism number present in cases of significant bacterurias. Microorganism numbers of less than 100,000/ml. down to 10,000/ml. are found in cases of asymptomatic bacterurias and microorganism numbers below 10,000/ml. are regarded as "normal."

TABLE I

| Compound: | Incubation temperature in °C. | Escherichia coli (18) Coloration begins after hours— | Color | Streptococcus facalis (155) Coloration begins after hours— | Color |
|---|---|---|---|---|---|
| I | 37 | 5 | Red | 2 | Green. |
|   | 21 | 12 | Red-violet | 12 | Do. |
| II | 37 | 4 | Violet | 1 | Do. |
|    | 21 | 12 | do | 12 | Do. |
| III | 37 | 3 | do | 1 | Yellow-green. |
| IV | 37 | 4 | do | 1 | Green. |
| V | 37 | 18 | Brown | 18 | Orange. |
| VI | 37 | 4 | Red-brown | 1 | Brown. |
| VII | 37 | 4 | Red | 1 | Green. |
| VIII | 37 | 5 | Dark violet | 12 | Red. |
| IX | 37 | 5 | Brown | 2 | Brown. |
|    | 21 | 12 | do | 4 | Do. |
| X | 37 | 18 | Red | -- | -- |
| XII | 37 | 7 | Yellowish | 7 | Green. |
| XIII | 37 | 3 | Red-brown | 2 | Do. |
|      | 21 | 10 | Greenish | 5 | Do. |
| XIV | 37 | 18 | Violet | 18 | Violet. |
| XVI | 37 | 4 | Orange | 4 | Yellow-green. |
| XVII | 37 | 4 | Green | 4 | Green. |
|      | 21 | 12 | do | 12 | Do. |

TABLE II

| Compound: | Incubation temperature in °C. | Proteus mirabilis (298) Coloration begins after hours— | Color | Staphylococcus aureus SG 511 (12) Coloration begins after hours— | Color |
|---|---|---|---|---|---|
| I | 37 | 4 | Brown | 12 | Yellow-green. |
|   | 21 | 12 | do | 12 | Do. |
| II | 37 | 4 | Violet | 12 | Green. |
|    | 21 | 12 | do | 12 | Do. |
| III | 37 | 4 | Red-brown | 12 | Brown-red. |
| IV | 37 | 4 | Brown | 12 | Yellow-green. |
| V | 37 | 18 | Orange | -- | -- |
| VI | 37 | 5 | Red-brown | 8 | Violet. |
| VII | 37 | 4 | Brown | 12 | Yellow. |
| VIII | 37 | 5 | do | -- | -- |
| IX | 37 | 4 | do | 12 | Brown. |
|    | 21 | 12 | do | 12 | Yellow-brown. |
| X | 37 | 18 | Red | -- | -- |
| XII | 37 | 6 | Green | 12 | Yellow-green. |
| XIII | 37 | 3 | Red | 10 | Olive green. |
|      | 21 | 10 | Red-brown | 10 | Greenish. |
| XIV | 37 | 18 | Violet | 18 | Violet. |
| XVI | 37 | 12 | Yellow-orange | 12 | Orange. |
| XVII | 37 | 7 | Greenish | 8 | Green. |
|      | 21 | 12 | Yellow-green | -- | -- |

TABLE III

| Cmpd. | Incubation temperature in °C. | Klebsiella pneumoniae (188) Coloration begins after hours— | Color | Pseudomonas aeruginosa (71) Coloration begins after hours— | Color |
|---|---|---|---|---|---|
| I | 37 | 6 | Violet-brown | 12 | Greenish. |
|   | 21 | 14 | Brown | 14 | Do. |
| II | 37 | 4 | Violet | 12 | Red-brown. |
|    | 21 | 12 | do | 12 | Green-brown. |
| III | 37 | 4 | do | 12 | Brown. |
| IV | 37 | 4 | do | 12 | Greenish-brown. |
| V | 37 | -- | -- | -- | -- |
| VI | 37 | 12 | Red | 12 | Red-brown. |
| VII | 37 | 5 | Red-brown | 12 | Brown. |
| VIII | 37 | 12 | Brown | 12 | Yellow. |
| IX | 37 | 12 | Red-brown | 12 | Brown. |
|    | 21 | 12 | Yellow-brown | 12 | Yellow-orange. |
| X | 37 | 18 | Brown | -- | -- |
| XII | 37 | 7 | Orange-red | 12 | Yellow-green. |
| XIII | 37 | 3 | Brown-green | 3 | Green. |
|      | 21 | 10 | Yellow-green | 10 | Do. |
| XIV | 37 | 18 | Violet | 18 | Violet. |
| XVI | 37 | 6 | Orange | -- | -- |
| XVII | 37 | 4 | Green | 12 | Yellow-green. |
|      | 21 | 12 | do | -- | -- |

EXAMPLE 2

Semi-quantitative determination of the number of microorganisms (a) *Escherichia coli* (69).—Compound XVII was used at a concentration of 32 µg./ml. and an incubating temperature of 37° C. When the number of microorganisms amounted to 1,000 to 10,000/ml., no color change took place, even after ten hours. In the case of microorganisms present in an amount of 10,000 to 50,000/ml., the yellowish solution took on a clear green color after ten hours. When the number of microorganisms was 50,000 to 100,000/ml., this coloration occurred after only nine hours, when the number of microorganisms present was 100,000 to 500,000/ml., coloration appeared after eight hours, and when the number of microorganisms was more than 500,000/ml., after only seven hours.

(b) *Klebsiella pneumoniae* (286).—There was used Compound II at a concentration of 64 µg./ml. and an incubation temperature of 37° C. When the number of microorganisms present was from 1,000 to 100,000/ml., after nine hours, the yellowish solution became red-brown and after ten hours, violet. In the case where the microorganisms were present in an amount of 100,000 to more than 500,000/ml., the red-brown color appeared after only seven-eight hours, and the violet color after only nine hours.

(c) *Proteus mirabilis* (298).—Compound XIII was employed at a concentration of 32 µg./ml. and an incubation temperature of 37° C. In the case of microorganisms present in an amount of 4,000,000/ml., the pale yellow solution became red after only four hours. When the number of microorganisms equalled 400,000/ml., the color change occurred after six hours, with 40,000/ml. the color change was apparent after seven hours, with 4,000/ml. after eight hours, and with 400/ml. after nine hours.

EXAMPLE 3

1.8 ml. of nutrient broth containing microorganisms were incubated for five hours at 37° C. Thereafter, 0.2 ml. of a solution which contained Compound II in a concentration of 500 µg./ml. was added. (For the preparation of this solution, 10 mg. of Compound II were dissolved in 2 ml. dimethyl formamide and 2 ml. polyoxyethylene sorbitan laureate ("Tween" 20), thereafter mixed with 6 ml. distilled water and then again diluted with distilled water in a ratio of 1:1.) After incubating for half an hour, the coloration was evaluated. In the following table, there are summarized the results of experiments with various microorganisms and different numbers of microorganisms.

TABLE IV

| Test organism | Number of microorganisms/ml. | | |
|---|---|---|---|
| | 50,000-100,000 | 100,000-500,000 | More than 500,000 |
| *Escherichia coli* (18) | | Weak violet | Violet. |
| *Streptococcus faecalis* (155) | | Violet | Do. |
| *Proteus mirabilis* (298) | | do | Do. |
| *Staphylococcus aureus* SG 511 (12) | | | Brown-violet. |
| *Klebsiella pneumoniae* (188) | | | Violet. |

As can be seen from this table, substantially clearer color changes are observed in case microorganisms are present in amounts which are of significance in practice.

EXAMPLE 4

Using a procedure analogous to that described in Example 3, a nutrient broth containing microorganisms or a urine sample containing microorganisms was incubated for five hours at 37° C., then mixed with 0.2 ml. of a solution of compound XVII, incubated for a further half an hour and thereafter evaluated for color development. As in Example 3, the solution of compound XVII was prepared from 10 mg. of the compound XVII in 2 ml. dimethyl formamide, 2 ml. polyoxyethylene sorbitan laureate and 6 ml. distilled water followed by dilution with distilled water in a ratio of 1:1. The results obtained with various types of microorganisms and various numbers of microorganisms are summarized in the following Table V:

TABLE V

| Test organism | Number of microorganisms/ml. | | | |
|---|---|---|---|---|
| | 10,000-50,000 | 50,000-100,000 | 100,000-500,000 | More than 500,000 |
| *Escherichia* (18) | | | | Pale green. |
| *Streptococcus faecalis* (155) | | | Green | Green. |
| *Proteus mirabilis* (298) | | | do | Do. |
| *Klebsiella pneumoniae* (188) | | Pale green | Pale green | Pale green. |

As can be seen from this table, sharp limits of the color change are observed in the instances where the numbers of microorganisms present are those of significance in practice.

EXAMPLE 5

In 1.8 ml. of a urine sample containing microorganisms, there were dissolved the contents of a gelatin capsule which consisted of 10 mg. soya peptone, 5 mg. dextrose, 10 mg. sodium chloride and 5 mg. dipotassium hydrogen phosphate, and additionally the following additives which serve to promote the reaction: 4 mg. DPN, 1 mg. Cysteine and 0.1 mg. manganous chloride tetrahydrate.

The sample was incubated for two hours at 37° C. and then mixed with 0.2 ml. of a solution of compound II at a concentration of 500 µg/ml. (For the preparation of this solution, 10 mg. of compound II were dissolved in 2 ml. dimethyl formamide and 2 ml. polyoxyethylene-sorbitan laureate ("Tween 20"), the solution was then mixed with 6 ml. distilled water and thereafter again diluted with distilled water in a ratio of 1:1). After an incubation time of half an hour, the coloration was evaluated for the first time. Further evaluations were carried out after further incubation for one and two hours.

In the following Table VI, there are summarized the results of this procedure where the number of microorganisms was about 3,000,000/ml.:

TABLE VI

| Test organism | Color after further incubation | | |
|---|---|---|---|
| | ½ hour | 1 hour | 2 hours |
| Escherichia coli (18) | Violet | Deep violet | Deep violet. |
| Proteus mirabilis (298) | Yellow | Violet | Violet. |
| Klebsiella pneumoniae (188) | Pale violet | do | Do. |
| Streptococcus faecalis (155) | Violet | do | Do. |
| Staphylococcus aureus SG 511 (12) | Yellow | Pale violet | Do. |

A series of parallel experiments using the same nutrient medium but without the additives which act to promote the reaction was carried out. After such short preliminary incubation times, color changes which are visible to the naked eye could not be ascertained.

EXAMPLE 6

The color which is formed when microorganism-containing solutions were incubated with compound II could be measured in a photometer at 578 nm. even in the case of quite low concentrations. The following measurements, which were carried out on an aqueous suspension containing 30 million microorganisms per milliliter with the immediate addition of compound II, establish that, by the addition of 1 mg. DPN or TPN, the development of the color commences substantially earlier. It is to be noted that at an extinction of about E=0.200, a change from yellow to violet can be clearly observed by the naked eye. The results obtained are set out in the following Table VII:

TABLE VII

| Incubation time | DPN | TPN | Without addition |
|---|---|---|---|
| Initial value | E=0.150 (yellow) | E=0.160 (yellow) | E=0.102 (yellow). |
| 1 hour | E=0.180 (yellow) | E=0.180 (yellow) | E=0.130 (yellow). |
| 2 hours | E=0.475 (violet) | E=0.400 (violet) | E=0.200 (yellow). |
| 3 hours | E=0.710 (violet) | E=0.680 (violet) | E=0.445 (violet). |
| 4 hours | E=0.750 (violet) | E=0.750 (violet) | E=0.725 (violet). |
| 5 hours | E=0.680 (violet) | E=0.680 (violet) | E=0.700 (violet). |

EXAMPLE 7

In the same manner as described in Example 6, bacterial suspensions of Escherichia coli (18) which contain 630,000 microorganisms per milliliter and increasing amounts of DPN were incubated and evaluated photometrically. The results which were obtained are set out in Table VIII.

TABLE VIII

| DPN concentration per reaction sample, mg. | 2 hours | 3 hours | 4 hours | 5 hours |
|---|---|---|---|---|
| 0 | 0.079 | 0.071 | 0.098 | 0.120 |
| 1 | 0.196 | 0.690 | 0.745 | 0.638 |
| 2 | 0.234 | 0.720 | 0.745 | 0.630 |
| 3 | 0.274 | 0.760 | 0.750 | 0.690 |
| 4 | 0.304 | 0.820 | 0.760 | 0.650 |

EXAMPLE 8

Urine samples from clinical patients in which microorganism numbers of between 10,000 and 3,000,000 per milliliter had been determined in the conventional manner, without a specification of the nature of the microorganisms having been established, were investigated in the manner described in Example 5. After a preliminary incubation of only two hours and a further incubation of half an hour, the urine samples showed a violet color, indicating more than 2,000,000 microorganisms per milliliter. Urine samples which contained about 100,000 microorganisms per milliliter became violet colored after a further incubation period of one-two hours.

All of the compounds of Formula 1 are new and can be used as described herein for the detection of bacteria in biological and other fluids.

However, compounds corresponding to Formula 1a i.e.,

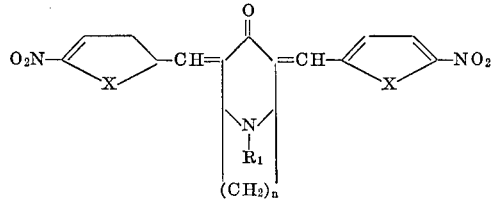

wherein X is an oxygen, sulfur or an alkylated nitrogen atom and $R_1$ is an aliphatic, aromatic, araliphatic, acyl, hydroxy or acyloxy substituted aliphatic radical and $n$ is 2 or 3 are particularly effective when employed as herein described for the detection of bacteria.

Preferred solubilizers for the new compounds are besides polyoxyethylene sorbitan laureate ("Tween 20") condensation products of higher alcohols with ethyleneoxide ("Emulgin") (a registered trademark of Dehydag, Düsseldorf) and mixtures of dioxane with polyethyleneglycole 6000.

Preferred liquid nutrient broths, as used within the scope of this invention, are for example that of Difco, containing within 1 litre 10 g. peptone, 5 g. sodium chloride, 2 g. dextrose, 2.5 g. dipotassium hydrogen phosphate and an extract of calves' brains and neat's hearts, or Nutrient Broth C M 1, Oxoid, containing 5 g. peptone, 1 g. extract of meat, 5 g. sodium chloride and 2 g. extract of yeast. A typical example of a solidified nutrient medium contains 15.6 g. peptone, 5.6 g. sodium chloride, 1 g. dextrose, 2.8 g. extract of yeast and 30 g. agar-agar.

We claim:
1. A diagnostic agent for use in the detection of bacteria in biological and other fluids comprising a nutrient medium and a non-growth inhibiting amount of a compound of the formula:

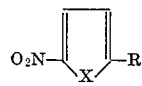

wherein X is a member selected from the group consisting of oxygen, sulfur and alkylated nitrogen atoms and R is a member selected from the group consisting of

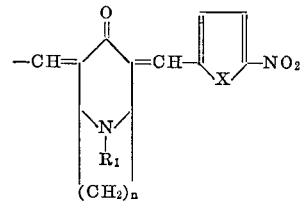 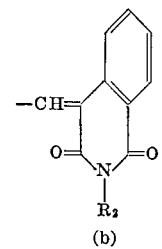

(a)              (b)

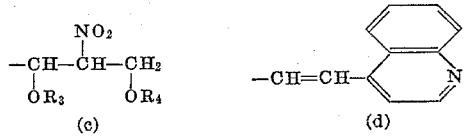

(c)     (d)

and

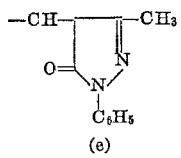

(e)

wherein $R_1$ is a member selected from the group consisting of aliphatic, aromatic, araliphatic, acyl, hydroxy and acyloxy aliphatic radicals, $R_2$ is a member selected from the group consisting of hydrogen and lower alkyl, $R_3$ and $R_4$ are each hydrogen or together form an isopropylidene radical and $n$ is 2 or 3, wherein said compound is present in an amount effective to produce a color change directly related to the amount of bacteria present in said fluid.

2. A diagnostic agent according to claim 1, additionally containing a solubilizer for said compound.

3. A diagnostic agent according to claim 1, additionally containing at least one coenzyme.

4. A diagnostic agent according to claim 3 wherein said coenzyme is a member selected from the group consisting of nicotine-adenosine-nucleotide, nicotine-adenosine-nucleotide-phosphate and reduction products thereof.

5. A diagnostic agent according to claim 2, additionally containing at least one coenzyme.

6. A diagnostic agent according to claim 1, additionally containing at least one member selected from the group consisting of sulfhydryl group containing compounds and their corresponding dehydrated disulfide compounds.

7. A diagnostic agent according to claim 6 wherein said sulfhydryl containing compound is a member selected from the group consisting of cysteine, reduced glutathione, cysteamine and β-mercapto-ethanol.

8. A diagnostic agent according to claim 1, additionally containing at least one enzyme-activating heavy metal ion.

9. A diagnostic agent according to claim 8 wherein said metal ion is a member selected from the group consisting of manganese and copper.

10. A diagnostic agent according to claim 1, additionally containing at least one member selected from the group consisting of solubilizers for said compound, coenzymes, sulfhydryl group containing compounds, their corresponding dehydrated disulfide compounds, and enzyme-activating heavy metal ions.

11. A diagnostic agent according to claim 1 in tablet form.

12. A diagnostic agent according to claim 1 in the form of a strip of impregnated filter paper.

13. A diagnostic agent according to claim 1 wherein said compound is in the form of a stable solution and the nutrient medium is present in solid form enclosed in a capsule.

14. A diagnostic agent according to claim 13 wherein there is additionally present in said capsule at least one member selected from the group consisting of coenzymes, sulfhydryl group containing compounds, their corresponding dehydrated disulfide compounds and enzyme-activating metal ions.

15. Process for the detection of bacteria in biological, or other fluids, which comprises incubating the fluid to be analyzed with a diagnostic agent according to claim 1 and thereafter visually, or photometrically, evaluating the resulting color change.

16. Process according to claim 15 which comprises incubating said fluid to be analyzed with said diagnostic agent for from 1–18 hours at 20–37° C.

17. Process for the detection of bacteria in biological fluids which comprises incubating the fluid to be analyzed together with a nutrient medium and thereafter introducing a non-growth-inhibiting amount of a compound of the formula:

wherein X is a member selected from the group consisting of oxygen, sulfur and alkylated nitrogen atoms and R is a member selected from the group consisting of:

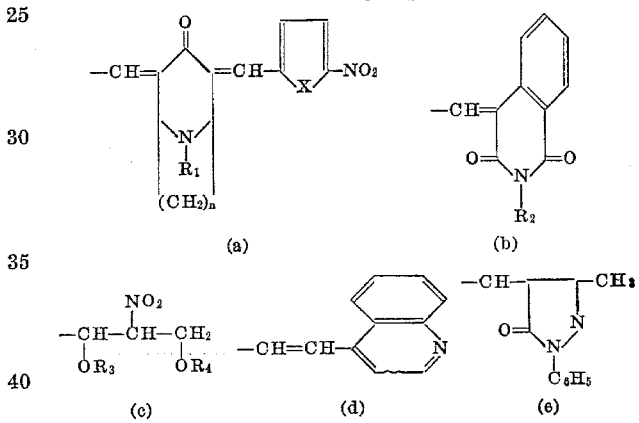

and wherein $R_1$ is a member selected from the group consisting of aliphatic, aromatic, araliphatic, acyl, hydroxy and acyloxy aliphatic radicals, $R_2$ is a member selected from the group consisting of hydrogen and lower alkyl, $R_3$ and $R_4$ are each hydrogen or together form an isopropylidene radical and $n$ is 2 or 3, wherein said compound is present in an amount effective to produce a color change directly related to the amount of bacteria present in said fluid, continuing said incubation and thereafter visually or photometrically evaluating the resulting color change.

References Cited

UNITED STATES PATENTS

| | | | |
|---|---|---|---|
| 2,987,449 | 6/1961 | Miller et al. | 195—100 |
| 3,083,145 | 3/1963 | Ryan | 195—103.5 |

ALVIN E. TANENHOLTZ, Primary Examiner

U.S. Cl. X.R.

195—99, 100; 260—240, 310, 326.5, 347.8, 332.3

UNITED STATES PATENT OFFICE
CERTIFICATE OF CORRECTION

Patent No. 3,496,066                      February 17, 1970

Herbert Berger et al.

It is certified that error appears in the above identified patent and that said Letters Patent are hereby corrected as shown below:

Column 3, first formula, "N" should read -- X --; "X" should read -- R --. Column 5, line 59, "sulphhydroyl" should read -- sulphhydryl --. Column 12, Table V, first item in body of table, "Escherichia (18)" should read -- Escherichia coli (18) --. Column 14, first formula

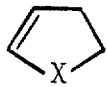        should read        

Signed and sealed this 28th day of July 1970.

(SEAL)
Attest:

EDWARD M. FLETCHER, JR.
Attesting Officer

WILLIAM E. SCHUYLER, JR.
Commissioner of Patents